(12) United States Patent
Jung et al.

(10) Patent No.: US 12,332,411 B2
(45) Date of Patent: **\*Jun. 17, 2025**

(54) OPTICAL IMAGING SYSTEM

(71) Applicant: SAMSUNG ELECTRO-MECHANICS CO., LTD., Suwon-si (KR)

(72) Inventors: Phil Ho Jung, Suwon-si (KR); Yong Joo Jo, Suwon-si (KR); Hag Chul Kim, Suwon-si (KR); Tae Yeon Lim, Suwon-si (KR)

(73) Assignee: Samsung Electro-Mechanics Co., Ltd., Suwon-si (KR)

(\*) Notice: Subject to any disclaimer, the term of this patent is extended or adjusted under 35 U.S.C. 154(b) by 0 days.

This patent is subject to a terminal disclaimer.

(21) Appl. No.: 18/428,799

(22) Filed: Jan. 31, 2024

(65) Prior Publication Data

US 2024/0168267 A1    May 23, 2024

Related U.S. Application Data

(63) Continuation of application No. 17/215,699, filed on Mar. 29, 2021, now Pat. No. 11,921,266.

(30) Foreign Application Priority Data

Nov. 30, 2020  (KR) .......................... 10-2020-0164928

(51) Int. Cl.
*G02B 13/00*  (2006.01)
*G02B 9/10*  (2006.01)

(52) U.S. Cl.
CPC ........... *G02B 13/0065* (2013.01); *G02B 9/10* (2013.01)

(58) Field of Classification Search
CPC ...... G02B 13/0065; G02B 9/10; G02B 15/16; G02B 15/14; G02B 13/0015;
(Continued)

(56) References Cited

U.S. PATENT DOCUMENTS 4,730,199 A \* 3/1988 Ikemori ................. G03B 19/12
358/906
5,319,405 A \* 6/1994 Ikemori ................. G03B 19/12
396/386
(Continued)

FOREIGN PATENT DOCUMENTS

CN    103620471 B    8/2016
CN    110737077 A    1/2020
(Continued)

OTHER PUBLICATIONS

Taiwanese Office Action Issued on Apr. 26, 2024 in Counterpart Taiwanese Patent Application No. 112116101 (7 Pages in English, 8 Pages in Chinese).
(Continued)

*Primary Examiner* — Mustak Choudhury
(74) *Attorney, Agent, or Firm* — NSIP Law

(57) ABSTRACT

An optical imaging system includes: a first lens group including a plurality of lenses; a second lens group including a plurality of lenses; a first reflecting member disposed on an object side of the first lens group; and a plurality of second reflecting members arranged between the second lens group and an image sensor. One or both of the first lens group and the second lens group is movable along an optical axis, an interval along the optical axis between the first lens group and the second lens group is varied between a first interval and a second interval smaller than the first interval, and as
(Continued)

at least one of the first lens group and the second lens group is moved, one or more of the second reflecting members are moved.

16 Claims, 12 Drawing Sheets

(58) Field of Classification Search
CPC .......................... G02B 13/0045; G02B 13/18; G02B 15/1425; G02B 15/142; G01B 17/08
USPC .......................................................... 359/793
See application file for complete search history.

(56) References Cited

U.S. PATENT DOCUMENTS

| | | | |
|---|---|---|---|
| 7,310,192 | B2 | 12/2007 | Nagai et al. |
| 9,557,627 | B2 | 1/2017 | Mercado |
| 2006/0092524 | A1* | 5/2006 | Konno ............... G02B 13/0065 359/678 |
| 2008/0088942 | A1 | 4/2008 | Seo |
| 2013/0201382 | A1 | 8/2013 | Ueda et al. |
| 2014/0111869 | A1 | 4/2014 | Kawamura |
| 2015/0061976 | A1 | 3/2015 | Ferri |
| 2015/0253647 | A1 | 9/2015 | Mercado |
| 2016/0170187 | A1 | 6/2016 | Kuo et al. |
| 2016/0363743 | A1 | 12/2016 | Yoo |
| 2017/0108669 | A1 | 4/2017 | Kim |
| 2017/0336620 | A1* | 11/2017 | Kato ........................ G03B 5/00 |
| 2019/0056566 | A1 | 2/2019 | Yoo et al. |
| 2020/0096745 | A1 | 3/2020 | Chang et al. |
| 2020/0150406 | A1 | 5/2020 | Chen et al. |
| 2020/0150516 | A1 | 5/2020 | Uchida et al. |

FOREIGN PATENT DOCUMENTS

| | | |
|---|---|---|
| CN | 110879454 A | 3/2020 |
| CN | 111190317 A | 5/2020 |
| CN | 111308656 A | 6/2020 |
| CN | 111638588 A | 9/2020 |
| CN | 106249390 B | 10/2020 |
| JP | 2006-171449 A | 6/2006 |
| JP | 2019-61131 A | 4/2019 |
| JP | 2019-204115 A | 11/2019 |
| KR | 10-2090625 B1 | 3/2020 |
| KR | 10-2020-0072256 A | 6/2020 |
| TW | I522647 B | 2/2016 |
| TW | I570431 B | 2/2017 |
| WO | WO2016/194612 A1 | 12/2016 |

OTHER PUBLICATIONS

Taiwanese Office Action issued on May 11, 2022, in counterpart Taiwanese Patent Application No. 110112277 (7 pages in English and 8 pages in Mandarin).

Korean Office Action Issued on Sep. 16, 2022, in counterpart Korean Patent Application No. 10-2020-0164928 (5 Pages in Korean, 7 Pages in English).

Chinese Office Action issued on Sep. 23, 2022, in counterpart Chinese Patent Application No. 202110824151.9 (7 Pages in English, 8 Pages in Chinese).

Chinese Office Action issued on Nov. 23, 2022, in counterpart Chinese Patent Application No. 202210426335.4 (8 pages in English, 8 pages in Chinese).

Korean Office Action Issued on Nov. 29, 2022, in counterpart Korean Patent Application No. 10-2020-0164928 (7 Pages in English, 5 Pages in Korean).

* cited by examiner

OPTICAL IMAGING SYSTEM

CROSS-REFERENCE TO RELATED APPLICATION(S)

This application is a continuation of U.S. application Ser. No. 17/215,699 filed on Mar. 29, 2021, now U.S. Pat. No. 11,921,266 issued on Mar. 5, 2024, which claims the benefit under 35 USC 119 (a) of Korean Patent Application No. 10-2020-0164928 filed on Nov. 30, 2020 in the Korean Intellectual Property Office, the entire disclosures of which are incorporated herein by reference for all purposes.

BACKGROUND

1. Field

The following description relates to an optical imaging system.

2. Description of Background

A camera module has been standardly installed in a mobile electronic device including a smartphone.

In addition, a manner of mounting a plurality of camera modules having different focal lengths in the mobile electronic device in order to indirectly implement an optical zoom effect has been proposed.

However, such a manner requires the plurality of camera modules for the optical zoom effect, and thus, has a disadvantage that a structure may be complicated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system capable of implementing a zoom function by varying a focal length.

In one general aspect, an optical imaging system includes: a first lens group including a plurality of lenses; a second lens group including a plurality of lenses; a first reflecting member disposed on an object side of the first lens group; and a plurality of second reflecting members arranged between the second lens group and an image sensor, wherein one or both of the first lens group and the second lens group is movable along an optical axis, an interval along the optical axis between the first lens group and the second lens group is varied between a first interval and a second interval smaller than the first interval, and as at least one of the first lens group and the second lens group is moved, one or more of the second reflecting members are moved.

The first lens group may have negative refractive power, and the second lens group may have positive refractive power.

The first lens group may include a first lens and a second lens, and the second lens group may include a third lens, a fourth lens, and a fifth lens.

The first lens may have positive refractive power, and the second lens may have negative refractive power.

The third lens may have positive refractive power, the fourth lens may have negative refractive power, and the fifth lens may have positive refractive power.

The optical imaging system may satisfy fl/fh<0.7, where fl is an overall focal length of the optical imaging system when the interval between the first lens group and the second lens group is the first interval, and fh is an overall focal length of the optical imaging system when the interval between the first lens group and the second lens group is the second interval.

The optical imaging system may satisfy BFL_h>30 mm, where BFL_h is a distance along the optical axis from an image-side surface of a rearmost lens of the plurality of lenses included in the second lens group to an imaging plane when the interval between the first lens group and the second lens group is the second interval.

The optical imaging system may satisfy D1_2/D1_1<0.3, where D1_1 is the first interval, and D1_2 is the second interval.

The optical imaging system may satisfy FOVl/FOVh>1.6, where FOVl is a field of view of the optical imaging system when the interval between the first lens group and the second lens group is the first interval, and FOVh is a field of view of the optical imaging system when the interval between the first lens group and the second lens group is the second interval.

The optical imaging system may satisfy fG1/fG2<−0.5, where fG1 is a focal length of the first lens group, and fG2 is a focal length of the second lens group.

The second lens group may be configured to be movable along the optical axis such that a distance along the optical axis between the second lens group and the plurality of second reflecting members is varied.

The plurality of second reflecting members may include a second reflecting member, a third reflecting member, a fourth reflecting member, and a fifth reflecting member sequentially arranged from the second lens group toward the image sensor, the third reflecting member may be configured to be moved, such that an interval between the second reflecting member and the third reflecting member is varied, and the fourth reflecting member may be configured to be moved, such that an interval between the fourth reflecting member and the fifth reflecting member is varied.

The third reflecting member and the fourth reflecting member may be configured to be moved together.

The plurality of second reflecting members may include a second reflecting member and a third reflecting member sequentially arranged from the second lens group toward the image sensor.

The second reflecting member and the third reflecting member may be configured to be moved together.

The plurality of second reflecting members may include a fourth reflecting member disposed between the third reflecting member and the image sensor.

The third reflecting member and the fourth reflecting member may be configured to be moved together.

In another general aspect, an optical imaging system includes: a first lens group; a second lens group; and a reflecting member disposed on an image side of the second lens group to direct light that has passed through the second lens group to an image sensor. One or both of the first lens group and the second lens group are configured to be moved along an optical axis such that an interval between the first lens group and the second lens group along the optical axis is variable between a maximum interval and a minimum interval. The reflecting member is configured to be moved such that a distance that the light that has passed through the second lens group travels between the second lens group and the reflecting member is variable.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
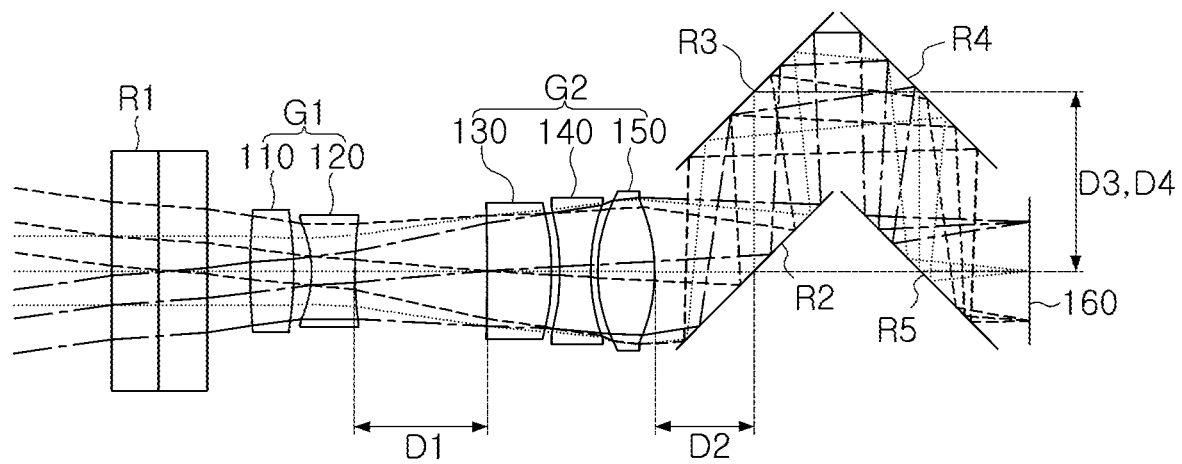
FIG. 1 is a view illustrating a state in which a first lens group and a second lens group are arranged in a first position in an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Hereinafter, examples will be described in detail with reference to the accompanying drawings.

In the drawings, thicknesses, sizes, and shapes of lenses have been slightly exaggerated for convenience of explanation. Particularly, shapes of spherical surfaces or aspherical surfaces illustrated in the drawings are illustrated by way of example. That is, the shapes of the spherical surfaces or the aspherical surfaces are not limited to those illustrated in the drawings.

An optical imaging system according to various examples may be mounted in a mobile electronic device. For example, the optical imaging system may be one component of a camera module mounted in the mobile electronic device. The mobile electronic device may be a portable electronic device such as a mobile communications terminal, a smartphone, or a tablet personal computer (PC).

The optical imaging system may include a plurality of lenses. The plurality of lenses may be arranged to be spaced apart from each other by preset distances.

As an example, the optical imaging system may include at least five lenses.

A first lens (or a foremost lens) refers to a lens closest to an object side (or a first reflecting member), while a last lens (or a rearmost lens) refers to a lens closest to an image sensor.

In addition, a first surface of each lens refers to a surface thereof close to the object side (or an object-side surface) and a second surface of each lens refers to a surface thereof close to an image side (or an image-side surface). Further, in the present specification, all numerical values of radii of curvature, thicknesses, distances, and the like, of lenses are indicated by millimeters (mm), and a field of view (FOV) is indicated by degrees.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a very narrow region in the vicinity of an optical axis.

An optical imaging system according to the various embodiments may include at least five lenses.

For example, the optical imaging system may include a first lens, a second lens, a third lens, a fourth lens, and a fifth lens sequentially arranged from the object side (or the first reflecting member).

The optical imaging system may include six or more lenses, if necessary. In addition, the optical imaging system may further include an image sensor converting an image of a subject incident on the image sensor into an electrical signal.

The optical imaging system may further include a plurality of reflecting members each having a reflecting surface changing a path of light. As an example, each of the plurality of reflecting members may be a mirror or a prism.

Any one of the reflecting members may be disposed in front of the plurality of lenses. As an example, a first reflecting member may be disposed in front of the first lens (that is, closer to the object side than the first lens is). The other reflecting members may be arranged behind the plurality of lenses. As an example, the other reflecting members may be arranged between the fifth lens and the image sensor.

The plurality of reflecting members may be arranged between the plurality of lenses and the image sensor to refract the light several times, resulting in an elongated path of light in a relatively narrow space.

Therefore, the optical imaging system may be miniaturized and have a great focal length.

Further, the optical imaging system may further include an infrared cut-off filter (hereinafter, referred to as a filter) cutting off infrared rays. The filter may be disposed between a reflecting member disposed closest to the image sensor among the plurality of reflecting members and the image sensor.

In the optical imaging system according to the various examples, all of the lenses may be formed of plastic materials.

All of the lenses may have an aspherical surface. For example, each of the first to fifth lenses may have at least one aspherical surface.

That is, at least one of first and second surfaces of all of the first to fifth lenses may be aspherical. Here, the aspherical surfaces of the first to fifth lenses may be represented by the following Equation 1:

$$Z = \frac{cY^2}{1+\sqrt{1-(1+K)c^2Y^2}} + AY^4 + BY^6 + CY^8 + DY^{10} + EY^{12}$$ [Equation 1]

In equation 1, c is a curvature (an inverse of a radius of curvature) of a lens, K is a conic constant, and Y is a distance from a certain point on an aspherical surface of the lens to an optical axis in a direction perpendicular to the optical axis. In addition, constants A to E are aspherical coefficients. In addition, Z is a distance (SAG) between the certain point on the aspherical surface of the lens at the distance Y and a tangential plane meeting the apex of the aspherical surface of the lens.

The first to fifth lenses may have positive refractive power/negative refractive power/positive refractive power/negative refractive power/positive refractive power sequentially from the object side.

The optical imaging system according to the various examples may satisfy at least one of the following Conditional Expressions:

| | |
|---|---|
| $fl/fh < 0.7;$ | [Conditional Expression 1] |
| $BLF\_h > 30$ mm; | [Conditional Expression 2] |
| $D1\_/D1\_1 < 0.3;$ | [Conditional Expression 3] |
| $FOVl/FOVh > 1.6;$ and | [Conditional Expression 4] |
| $fG1/fG2 < -0.5.$ | [Conditional Expression 5] |

In the conditional expressions, fl is an overall focal length of the optical imaging system in a first position, and fh is an overall focal length of the optical imaging system in a second position. The first position refers to a case in which a first lens group and a second lens group are spaced apart from each other by a first interval, and the second position refers to a case in which the first lens group and the second lens group are spaced apart from each other by a second interval. The second interval may be narrower than the first interval. The optical imaging system may have a greater overall focal length in the second position than in the first position.

BFL_h is a distance on the optical axis from an image-side surface of the last lens (for example, the fifth lens) to an imaging plane of the image sensor in the second position.

D1_1 is a distance on the optical axis between the first lens group and the second lens group in the first position, and D1_2 is a distance on the optical axis between the first lens group and the second lens group in the second position.

FOVl is a field of view of the optical imaging system in the first position, and FOVh is a field of view of the optical imaging system in the second position. The optical imaging system may have a narrower field of view in the second position than in the first position.

fG1 is a focal length of the first lens group among the plurality of lenses of the optical imaging system, and fG2 is a focal length of the second lens group among the plurality of lenses of the optical imaging system.

The optical imaging system according to the various examples may include a plurality of lens groups. As an example, the optical imaging system may include the first lens group and the second lens group. Each of the first lens group and the second lens group may include a plurality of lenses. The first lens group may be disposed in front of the second lens group.

The first lens group may include a first lens and a second lens. The first lens may have positive refractive power, and a first surface and a second surface of the first lens may be convex. The second lens may have negative refractive power, and a first surface and a second surface of the second lens may be concave. Alternatively, a first surface of the second lens may be concave, and a second surface of the second lens may be convex.

The first lens group may have negative refractive power as a whole.

The second lens group may include a third lens, a fourth lens, and a fifth lens. The third lens may have positive refractive power, and a first surface and a second surface of the third lens may be convex. The fourth lens may have negative refractive power, and a first surface and a second surface of the fourth lens may be concave. The fifth lens may have positive refractive power, and a first surface and a second surface of the fifth lens may be convex.

The second lens group may have positive refractive power as a whole.

At least one of the first lens group and the second lens group may be moved to change the overall focal length of the optical imaging system. For example, an interval between the first lens group and the second lens group may be varied. As an example, the first lens group may be fixedly disposed, and the second lens group may be movably disposed. In addition, an interval between the second lens group and the image sensor may also be varied.

At least a portion of the plurality of reflecting members arranged between the second lens group and the image sensor may be moved. Since the interval between the second lens group and the image sensor may be varied by moving at least a portion of the plurality of reflecting members, a focus may be easily formed on the image sensor even though a focal length of the optical imaging system is changed due to the movement of the second lens group.

Therefore, the optical imaging system may have an optical zoom function and/or a focusing function.

The optical image system may have a feature of a telephoto lens having a relatively narrow field of view and great focal length.

An optical imaging system according to a first example will be described with reference to FIGS. 1 through 4.

Figure 3:
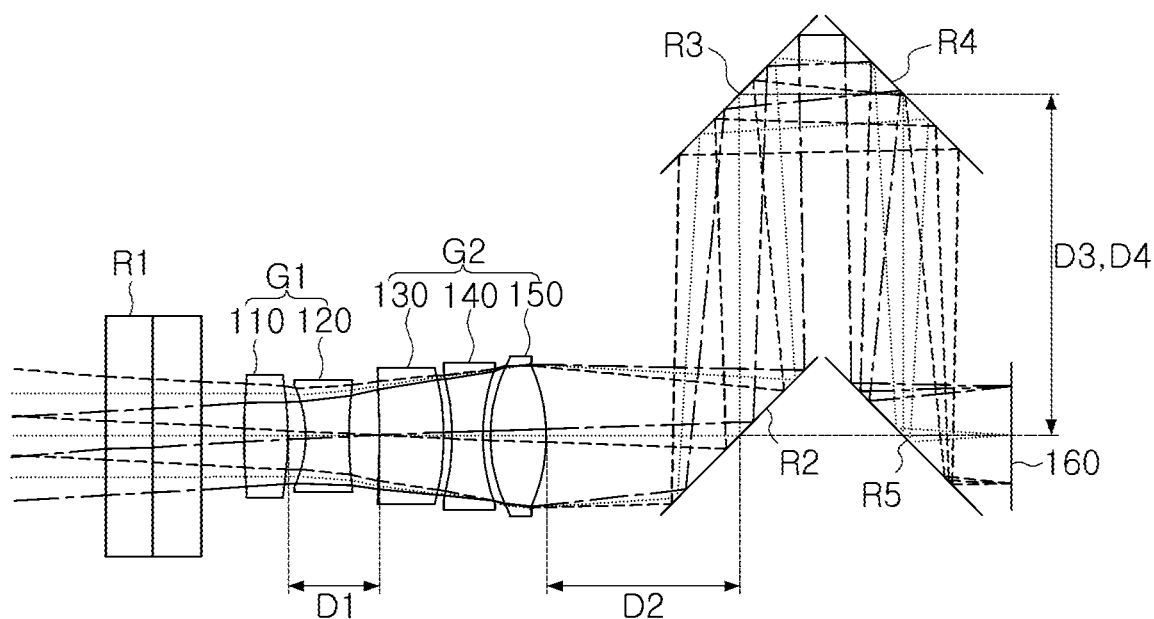
FIG. 3 is a view illustrating a state in which the first lens group and the second lens group are arranged in a second position in the optical imaging system according to the first example.

FIG. 1 is a view illustrating a state in which a first lens group and a second lens group are arranged in a first position, and FIG. 3 is a view illustrating a state in which the first lens group and the second lens group are arranged in a second position.

The optical imaging system according to the first example may include a first lens group G1 and a second lens group G2.

The first lens group G1 may include a first lens 110 and a second lens 120, and the second lens group G2 may include a third lens 130, a fourth lens 140, and a fifth lens 150. In addition, the optical imaging system may further include a filter and an image sensor 160. In addition, a stop may be disposed between the first lens group G1 and the second lens group G2. For example, the stop may be disposed between the second lens 120 and the third lens 130.

In addition, the optical imaging system may further include a first reflecting member R1 disposed in front of the first lens 110 and having a reflecting surface changing a path of light. In the first example, the first reflecting member R1 may be a prism, but may also be a mirror.

A case in which the prism has a flat panel shape is illustrated in FIGS. 1 and 3, but the prism may actually have a triangular prismatic shape.

Light incident on the first reflecting member R1 may be refracted by the first reflecting member R1 and then pass through the first lens group G1 and the second lens group G2. For example, light incident on the first reflecting member R1 along a first optical axis may be refracted toward a second optical axis perpendicular to the first optical axis.

In addition, the optical imaging system may further include a second reflecting member R2, a third reflecting member R3, a fourth reflecting member R4, and a fifth reflecting member R5 arranged behind the fifth lens 150, and each having a reflecting surface changing a path of the light. The second reflecting member R2, the third reflecting member R3, the fourth reflecting member R4, and the fifth reflecting member R5 may be arranged between the fifth lens 150 and the image sensor 160.

In the first example, the second reflecting member R2, the third reflecting member R3, the fourth reflecting member R4, and the fifth reflecting member R5 may be mirrors, but may also be prisms.

The light passing through the first lens group G1 and the second lens group G2 may be refracted by the second reflecting member R2. For example, the light passing through the first lens group G1 and the second lens group G2 may be refracted toward a third optical axis perpendicular to the second optical axis by the second reflecting member R2.

The light refracted by the second reflecting member R2 may be refracted again by the third reflecting member R3. For example, the light refracted toward the third optical axis by the second reflecting member R2 may be refracted toward a fourth optical axis perpendicular to the third optical axis by the third reflecting member R3.

The light refracted by the third reflecting member R3 may be refracted again by the fourth reflecting member R4. For example, the light refracted toward the fourth optical axis by the third reflecting member R3 may be refracted toward a fifth optical axis perpendicular to the fourth optical axis by the fourth reflecting member R4.

The light refracted by the fourth reflecting member R4 may be refracted again by the fifth reflecting member R5. For example, the light refracted toward the fifth optical axis by the fourth reflecting member R4 may be refracted toward a sixth optical axis perpendicular to the fifth optical axis by the fifth reflecting member R5, and be then received by the image sensor 160.

The filter may be disposed between the fifth reflecting member R5 and the image sensor 160.

In the present example, the first reflecting member R1, the second reflecting member R2, and the fifth reflecting member R5 may be fixed members whose positions are fixed, and the third reflecting member R3 and the fourth reflecting member R4 may be movable members whose positions may be varied.

Characteristics (radii of curvature, thicknesses of lenses or distances between the lenses, refractive indices, Abbe numbers, and focal lengths) of each lens are represented in Table 1.

TABLE 1

| Surface No. | Remark | Radius of Curvature | Thickness or Distance | Refractive Index | Abbe Number | Focal Length |
|---|---|---|---|---|---|---|
| S1 | First Reflecting Member | Infinity | 2.212 | 1.717 | 29.5 | |
| S2 | | Infinity | 2.212 | 1.717 | 29.5 | |
| S3 | | Infinity | 1.942 | | | |
| S4 | First Lens | 800.250 | 1.902 | 1.671 | 19.2 | 25.916 |
| S5 | | −17.991 | 0.850 | | | |
| S6 | Second Lens | −5.276 | 1.950 | 1.544 | 56 | −7.268 |
| S7 | | 18.158 | D1 | | | |
| S8 | Third Lens | 800.000 | 3.000 | 1.544 | 56 | 22.393 |
| S9 | | −12.410 | 0.350 | | | |
| S10 | Fourth Lens | −13.506 | 1.443 | 1.595 | 31.1 | −9.176 |
| S11 | | 9.648 | 0.320 | | | |
| S12 | Fifth Lens | 8.586 | 2.571 | 1.544 | 56 | 7.851 |
| S13 | | −7.667 | D2 | | | |
| S14 | Second Reflecting Member | Infinity | 0.000 | | | |
| S15 | | Infinity | D3 | | | |
| S16 | Third Reflecting Member | Infinity | 0.000 | | | |
| S17 | | Infinity | 7.500 | | | |
| S18 | Fourth Reflecting Member | Infinity | 0.000 | | | |
| S19 | | Infinity | D4 | | | |
| S20 | Fifth Reflecting Member | Infinity | 0.000 | | | |
| S21 | | Infinity | 5.000 | | | |
| S22 | Imaging Plane | Infinity | | | | |

At least one of the first lens group G1 and the second lens group G2 may be moved in order to change an overall focal length of the optical imaging system. As an example, the second lens group G2 may be moved along the optical axis of the optical imaging system, such that an interval between the first lens group G1 and the second lens group G2 may be varied and an interval between the second lens group G2 and the second reflecting member R2 may be varied. In addition, an interval between the second lens group G2 and the image sensor 160 may be varied. Here, the 'interval' may refer to a distance on the optical axis between two members.

At least two of the second reflecting member R2, the third reflecting member R3, the fourth reflecting member R4, and the fifth reflecting member R5 may be moved. For example, the third reflecting member R3 may be moved, such that an interval between the second reflecting member R2 and the third reflecting member R3 may be varied. In addition, the fourth reflecting member R4 may be moved, such that an interval between the fourth reflecting member R4 and the fifth reflecting member R5 may be varied. The third reflecting member R3 and the fourth reflecting member R4 may be moved together.

A length of the path of the light may be changed by the third reflecting member R3 and the fourth reflecting member R4.

TABLE 2

| | First Position | Second Position |
|---|---|---|
| D1 | 6 | 1.5 |
| D2 | 4.5 | 9 |
| D3 | 8.125 | 15.821 |
| D4 | 8.125 | 15.821 |

D1 is a distance on the optical axis between the second lens 120 and the third lens 130, D2 is a distance on the optical axis between the fifth lens 150 and the second reflecting member R2, D3 is a distance on the optical axis between the second reflecting member R2 and the third reflecting member R3, and D4 is a distance on the optical axis between the fourth reflecting member R4 and the fifth reflecting member R5.

An interval between the first lens group G1 and the second lens group G2 in the first position may be different from that between the first lens group G1 and the second lens group G2 in the second position. For example, the first lens group G1 and the second lens group G2 may be located relatively distant from each other in the first position, and may be located relatively close to each other in the second position.

The overall focal length of the optical imaging system may be changed by varying the interval between the first lens group G1 and the second lens group G2.

In addition, a length of the path of the light between the second lens group G2 and the image sensor 160 may be changed by moving some of a plurality of reflecting members arranged between the second lens group G2 and the image sensor 160. For example, positions of the third reflecting member R3 and the fourth reflecting member R4 in the first position may be different from positions of the third reflecting member R3 and the fourth reflecting member R4 in the second position.

In the first position, an overall focal length fl of the optical imaging system may be 16 mm, Fno_I may be 5.16, FOVl may be 10.1°, BFL_I may be 33.250 mm, TTL_I may be 51.636 mm, and PTTL_I may be 58.003 mm.

In the second position, an overall focal length fh of the optical imaging system may be 32 mm, Fno_h may be 8.17, FOVh may be 5°, BFL_h may be 53.142 mm, TTL_h may be 67.028 mm, and PTTL_h may be 73.395 mm.

Fno_I is an F-number of the optical imaging system in the first position, and Fno_h is an F-number of the optical imaging system in the second position.

FOVl is a field of view of the optical imaging system in the first position, and FOVh is a field of view of the optical imaging system in the second position.

BFL_I is a distance on the optical axis from an image-side surface of the fifth lens to an imaging plane of the image sensor in the first position, and BFL_h is a distance on the optical axis from the image-side surface of the fifth lens to the imaging plane of the image sensor in the second position.

TTL_I is a distance on the optical axis from an object-side surface of the first lens to the imaging plane of the image sensor in the first position, and TTL_h is a distance on the optical axis from the object-side surface of the first lens to the imaging plane of the image sensor in the second position.

PTTL_I is a distance on the optical axis from an object-side surface (or an incident surface) of the first reflecting member to the imaging plane of the image sensor in the first position, and PTTL_h is a distance on the optical axis from the object-side surface (or the incident surface) of the first reflecting member to the imaging plane of the image sensor in the second position.

In the first example, the first lens group G1 may have negative refractive power as a whole. A focal length of the first lens group G1 may be −10.766 mm.

The second lens group G2 may have positive refractive power as a whole. A focal length of the second lens group G2 may be 13.393 mm.

The first lens 110 may have positive refractive power, and a first surface and a second surface thereof may be convex.

The second lens 120 may have negative refractive power, and a first surface and a second surface thereof may be concave.

The third lens 130 may have positive refractive power, and a first surface and a second surface thereof may be convex.

The fourth lens 140 may have negative refractive power, and a first surface and a second surface thereof may be concave.

The fifth lens 150 may have positive refractive power, and a first surface and a second surface thereof may be convex.

Respective surfaces of the first to fifth lenses 110 to 150 may have aspherical coefficients as represented in Table 3. For example, all of object-side surfaces and image-side surfaces of the first to fifth lenses 110 to 150 may be aspherical.

TABLE 3

| | Conic Constant (K) | 4th-Order Coefficient (A) | 6th-Order Coefficient (B) | 8th-Order Coefficient (C) | 10th-Order Coefficient (D) | 12th-Order Coefficient (E) |
|---|---|---|---|---|---|---|
| S4 | 0 | 7.223E−04 | 1.151E−05 | 4.670E−06 | −6.291E−07 | 2.750E−08 |
| S5 | 0 | 4.744E−04 | 4.096E−05 | −1.174E−06 | 1.261E−07 | −7.009E−08 |
| S6 | 0 | 6.629E−04 | 2.838E−05 | 2.732E−07 | −3.917E−07 | −4.631E−08 |
| S7 | 0 | 2.159E−05 | −2.146E−05 | 4.083E−06 | −3.519E−07 | 1.032E−08 |
| S8 | 0 | −4.440E−04 | −9.538E−06 | −2.692E−06 | 3.367E−07 | −2.851E−08 |
| S9 | 0 | 1.363E−04 | −1.509E−05 | 1.587E−06 | −4.646E−07 | −7.799E−09 |
| S10 | 0 | −1.060E−04 | −5.914E−06 | −2.221E−06 | −3.493E−07 | −2.486E−09 |
| S11 | 0 | −4.393E−05 | −1.687E−05 | −4.610E−06 | 5.883E−08 | 1.951E−09 |
| S12 | 0 | 4.939E−06 | −3.569E−06 | −8.002E−07 | 1.115E−07 | −1.376E−09 |
| S13 | 0 | 1.438E−04 | 2.262E−05 | −7.418E−07 | 2.228E−07 | −2.247E−09 |

Figure 2:
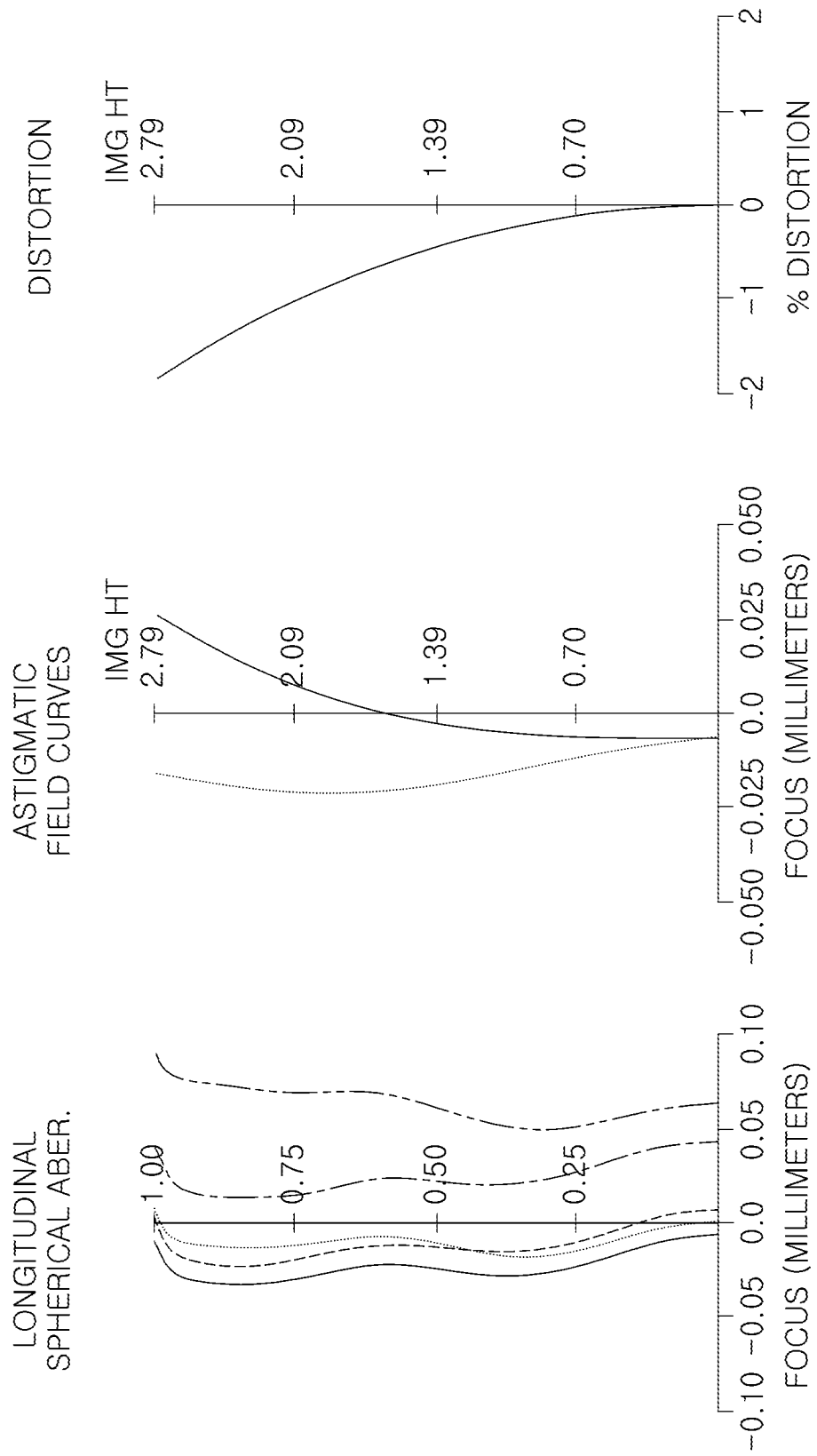
FIG. 2 is graphs having curves representing aberration characteristics of the optical imaging system illustrated in FIG. 1.
Figure 4:
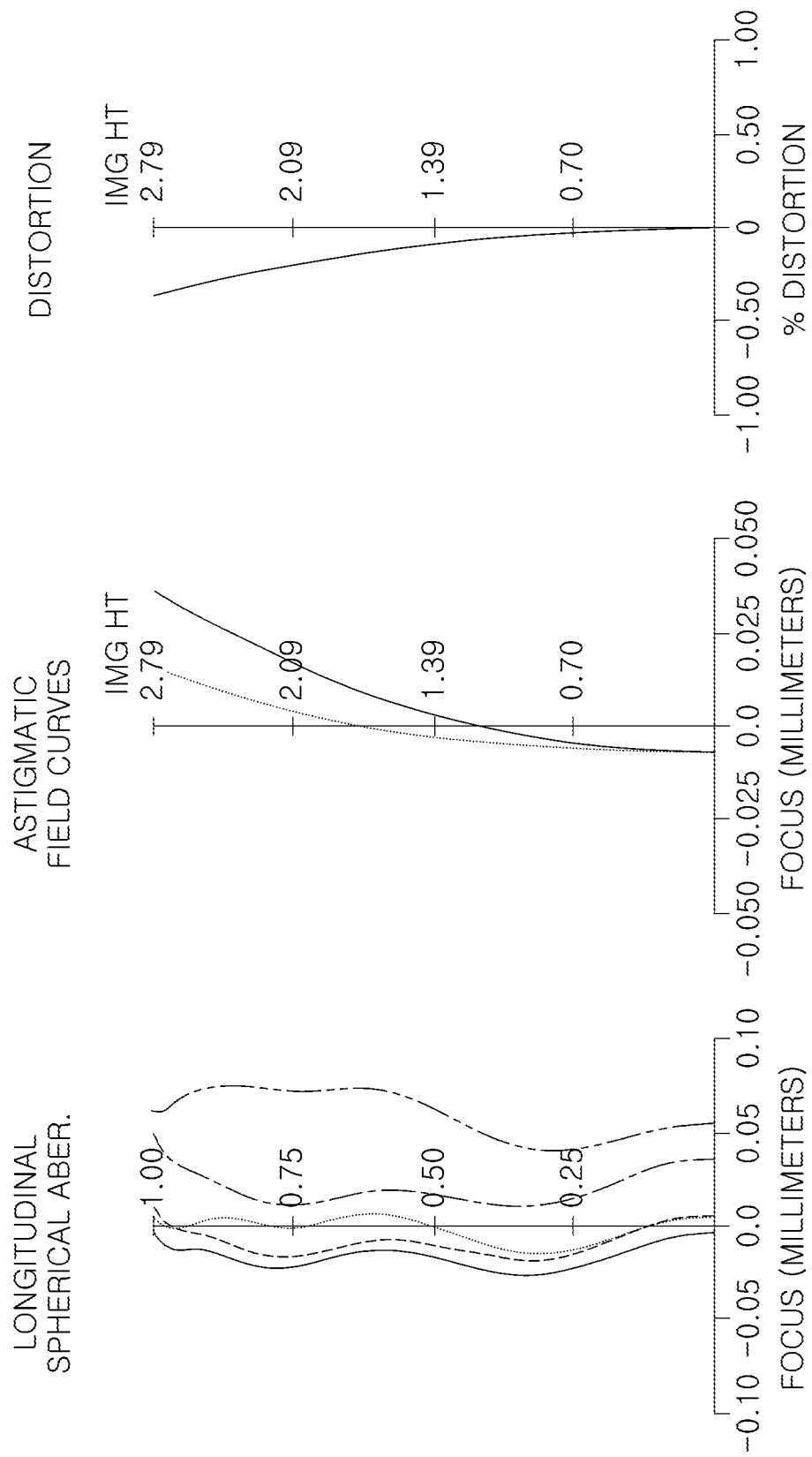
FIG. 4 is graphs having curves representing aberration characteristics of the optical imaging system illustrated in FIG. 3.

In addition, the optical imaging system configured as described above may have aberration characteristics illustrated in FIGS. 2 and 4.

An optical imaging system according to a second example will be described with reference to FIGS. 5 through 8.

Figure 5:
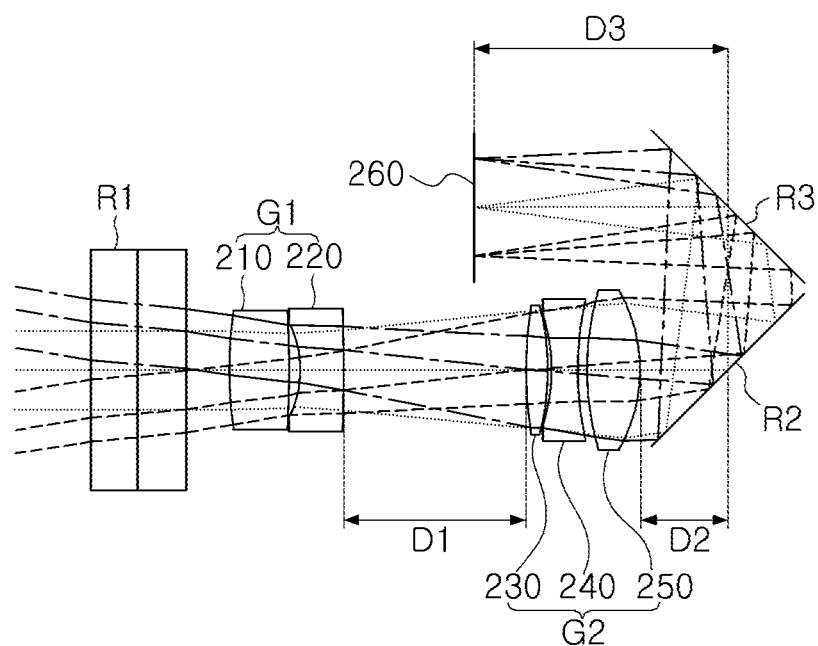
FIG. 5 is a view illustrating a state in which a first lens group and a second lens group are arranged in a first position in an optical imaging system according to a second example.
Figure 7:
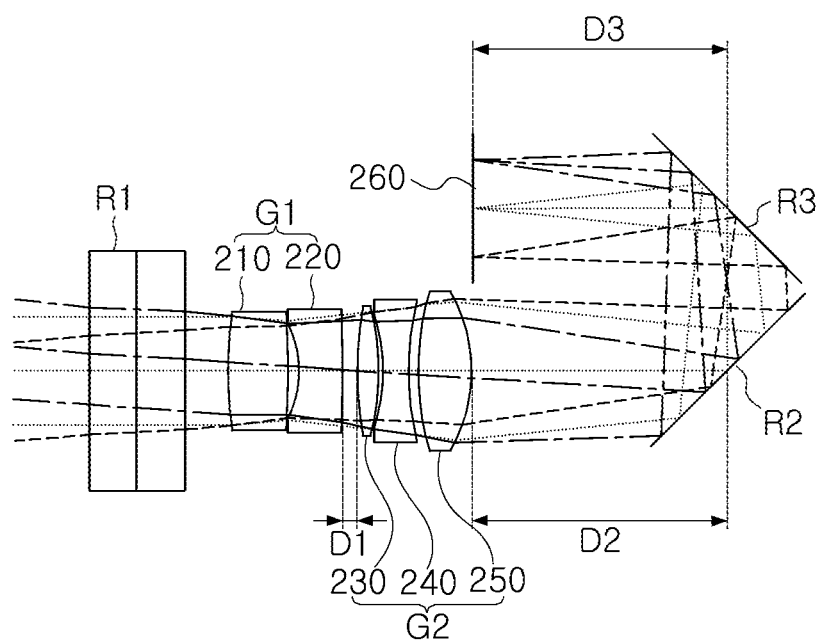
FIG. 7 is a view illustrating a state in which the first lens group and the second lens group are arranged in a second position in the optical imaging system according to the second example.

FIG. 5 is a view illustrating a state in which a first lens group and a second lens group are arranged in a first position, and FIG. 7 is a view illustrating a state in which the first lens group and the second lens group are arranged in a second position.

The optical imaging system according to the second example may include a first lens group G1 and a second lens group G2.

The first lens group G1 may include a first lens 210 and a second lens 220, and the second lens group G2 may include a third lens 230, a fourth lens 240, and a fifth lens 250. In addition, the optical imaging system may further include a filter and an image sensor 260. In addition, a stop may be disposed between the first lens group G1 and the second lens group G2. For example, the stop may be disposed between the second lens 220 and the third lens 230.

In addition, the optical imaging system may further include a first reflecting member R1 disposed in front of the first lens 210 and having a reflecting surface changing a path of light. In the second example, the first reflecting member R1 may be a prism, but may also be a mirror.

A case in which the prism has a flat panel shape is illustrated in FIGS. 5 and 7, but the prism may actually have a triangular prismatic shape.

Light incident on the first reflecting member R1 may be refracted by the first reflecting member R1 and then pass through the first lens group G1 and the second lens group G2. For example, light incident on the first reflecting member R1 along a first optical axis may be refracted toward a second optical axis perpendicular to the first optical axis.

In addition, the optical imaging system may further include a second reflecting member R2 and a third reflecting member R3 arranged behind the fifth lens 250 and each having a reflecting surface changing a path of light. The second reflecting member R2 and the third reflecting member R3 may be arranged between the fifth lens 250 and the image sensor 260.

In the second example, the second reflecting member R2 and the third reflecting member R3 may be mirrors, but may also be prisms.

The light passing through the first lens group G1 and the second lens group G2 may be refracted by the second reflecting member R2. For example, the light passing through the first lens group G1 and the second lens group G2 may be refracted toward a third optical axis perpendicular to the second optical axis by the second reflecting member R2.

The light refracted by the second reflecting member R2 may be refracted again by the third reflecting member R3. For example, the light refracted toward the third optical axis by the second reflecting member R2 may be refracted toward a fourth optical axis perpendicular to the third optical axis by the third reflecting member R3, and be then received by the image sensor 260.

The filter may be disposed between the third reflecting member R3 and the image sensor 260.

At least one of the first lens group G1 and the second lens group G2 may be moved in order to change an overall focal length of the optical imaging system. As an example, the second lens group G2 may be moved along the optical axis, such that an interval between the first lens group G1 and the second lens group G2 may be varied and an interval between the second lens group G2 and the second reflecting member R2 may be varied. In addition, an interval between the second lens group G2 and the image sensor 260 may be varied. Here, the 'interval' may refer to a distance on the optical axis between two members.

The second reflecting member R2 and the third reflecting member R3 may be moved. For example, the second reflecting member R2 and the third reflecting member R3 may be moved together, such that an interval between the second lens group G2 and the second reflecting member R2 and an interval between the third reflecting member R3 and the image sensor 260 may be varied.

In the present example, the first reflecting member R1 may be a fixed member whose position is fixed, and the second reflecting member R2 and the third reflecting member R3 may be movable members whose positions may be varied.

Characteristics (radii of curvature, thicknesses of lenses or distances between the lenses, refractive indices, Abbe numbers, and focal lengths) of each lens are represented in Table 4.

TABLE 4

| Surface No. | Remark | Radius of Curvature | Thickness or Distance | Refractive Index | Abbe Number | Focal Length |
|---|---|---|---|---|---|---|
| S1 | First Reflecting Member | Infinity | 2.212 | 1.717 | 29.5 | |
| S2 | | Infinity | 2.212 | 1.717 | 29.5 | |
| S3 | | Infinity | 1.942 | | | |
| S4 | First Lens | 34.849 | 2.750 | 1.671 | 19.2 | 20.781 |
| S5 | | −22.988 | 0.522 | | | |
| S6 | Second Lens | −4.680 | 1.950 | 1.573 | 37 | −9.289 |
| S7 | | −42.664 | D1 | | | |
| S8 | Third Lens | 13.422 | 0.955 | 1.544 | 56 | 13.838 |
| S9 | | −16.880 | 0.256 | | | |
| S10 | Fourth Lens | −7.908 | 1.129 | 1.586 | 32.6 | −7.742 |
| S11 | | 11.378 | 0.420 | | | |
| S12 | Fifth Lens | 11.995 | 2.445 | 1.544 | 56 | 8.283 |
| S13 | | −6.746 | D2 | | | |
| S14 | Second Reflecting Member | Infinity | 0.000 | | | |
| S15 | | Infinity | 7.455 | | | |
| S16 | Third Reflecting Member | Infinity | 0.000 | | | |
| S17 | | Infinity | D3 | | | |
| S18 | Imaging Plane | Infinity | | | | |

TABLE 5

| | First Position | Second Position |
|---|---|---|
| D1 | 8.339 | 0.689 |
| D2 | 4 | 11.65 |
| D3 | 11.544 | 11.562 |

D1 is a distance on the optical axis between the second lens 220 and the third lens 230, D2 is a distance on the optical axis between the fifth lens 250 and the second reflecting member R2, and D3 is a distance on the optical axis between the third reflecting member R3 and the image sensor 260.

An interval between the first lens group G1 and the second lens group G2 in the first position may be different from that between the first lens group G1 and the second lens group G2 in the second position. For example, the first lens group G1 and the second lens group G2 may be located relatively distant from each other in the first position, and may be located relatively close to each other in the second position.

The overall focal length of the optical imaging system may be changed by varying the interval between the first lens group G1 and the second lens group G2.

In addition, a length of the path of the light between the second lens group G2 and the image sensor 260 may be changed by moving a plurality of reflecting members arranged between the second lens group G2 and the image sensor 260. For example, positions of the second reflecting member R2 and the third reflecting member R3 in the first position may be different from positions of the second reflecting member R2 and the third reflecting member R3 in the second position.

In the first position, an overall focal length fl of the optical imaging system may be 13.9 mm, Fno_I may be 3.88, FOVl may be 11.5°, BFL_I may be 23,000 mm, TTL_I may be 41.767 mm, and PTTL_I may be 48.134 mm.

In the second position, an overall focal length fh of the optical imaging system may be 24.6 mm, Fno_h may be 4.97, FOVh may be 6.5°, BFL_h may be 30.667 mm, TTL_h may be 41.784 mm, and PTTL_h may be 48.151 mm.

In the second example, the first lens group G1 may have negative refractive power as a whole. A focal length of the first lens group G1 may be −18.451 mm.

The second lens group G2 may have positive refractive power as a whole. A focal length of the second lens group G2 may be 13.252 mm.

The first lens 210 may have positive refractive power, and a first surface and a second surface thereof may be convex.

The second lens 220 may have negative refractive power, and a first surface thereof may be concave and a second surface thereof may be convex.

The third lens 230 may have positive refractive power, and a first surface and a second surface thereof may be convex.

The fourth lens 240 may have negative refractive power, and a first surface and a second surface thereof may be concave.

The fifth lens 250 may have positive refractive power, and a first surface and a second surface thereof may be convex.

Respective surfaces of the first to fifth lenses 210 to 250 may have aspherical coefficients as represented in Table 6. For example, all of object-side surfaces and image-side surfaces of the first to fifth lenses 210 to 250 may be aspherical.

TABLE 6

|  | Conic Constant (K) | 4th-Order Coefficient (A) | 6th-Order Coefficient (B) | 8th-Order Coefficient (C) | 10th-Order Coefficient (D) | 12th-Order Coefficient (E) |
| --- | --- | --- | --- | --- | --- | --- |
| S4 | 0 | 1.014E−03 | 3.675E−05 | 1.181E−06 | 1.307E−08 | −1.065E−09 |
| S5 | 0 | 3.881E−04 | 1.019E−04 | 6.765E−06 | 3.148E−08 | 3.894E−08 |
| S6 | 0 | 9.742E−04 | 9.341E−05 | 6.824E−06 | −6.105E−07 | −7.356E−19 |
| S7 | 0 | 6.175E−04 | −1.853E−05 | 1.236E−06 | −2.471E−07 | 4.069E−19 |
| S8 | 0 | −4.097E−04 | −2.042E−05 | −5.888E−06 | 6.223E−08 | −3.780E−09 |
| S9 | 0 | 7.849E−05 | −5.173E−06 | 8.819E−07 | −5.267E−07 | −1.913E−18 |
| S10 | 0 | 1.386E−04 | 1.333E−05 | 3.180E−06 | −3.562E−07 | 4.974E−19 |
| S11 | 0 | −1.606E−04 | −2.622E−05 | −5.040E−06 | 7.900E−08 | −2.235E−18 |
| S12 | 0 | −2.973E−05 | −5.570E−06 | −1.102E−06 | 8.573E−08 | −3.864E−09 |
| S13 | 0 | 2.770E−04 | 1.974E−05 | −1.139E−06 | 2.339E−07 | −5.720E−09 |

Figure 6:
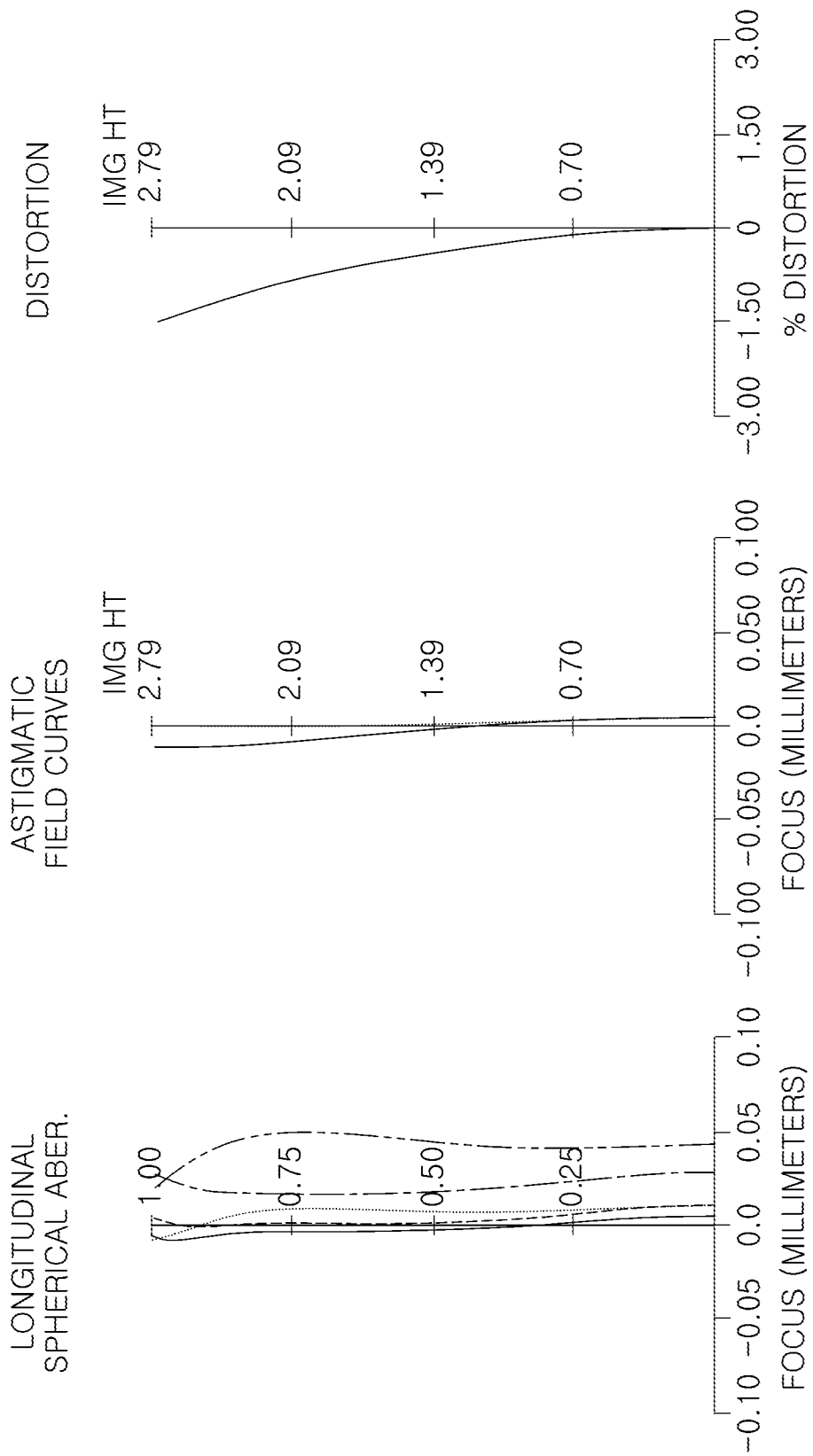
FIG. 6 is graphs having curves representing aberration characteristics of the optical imaging system illustrated in FIG. 5.
Figure 8:
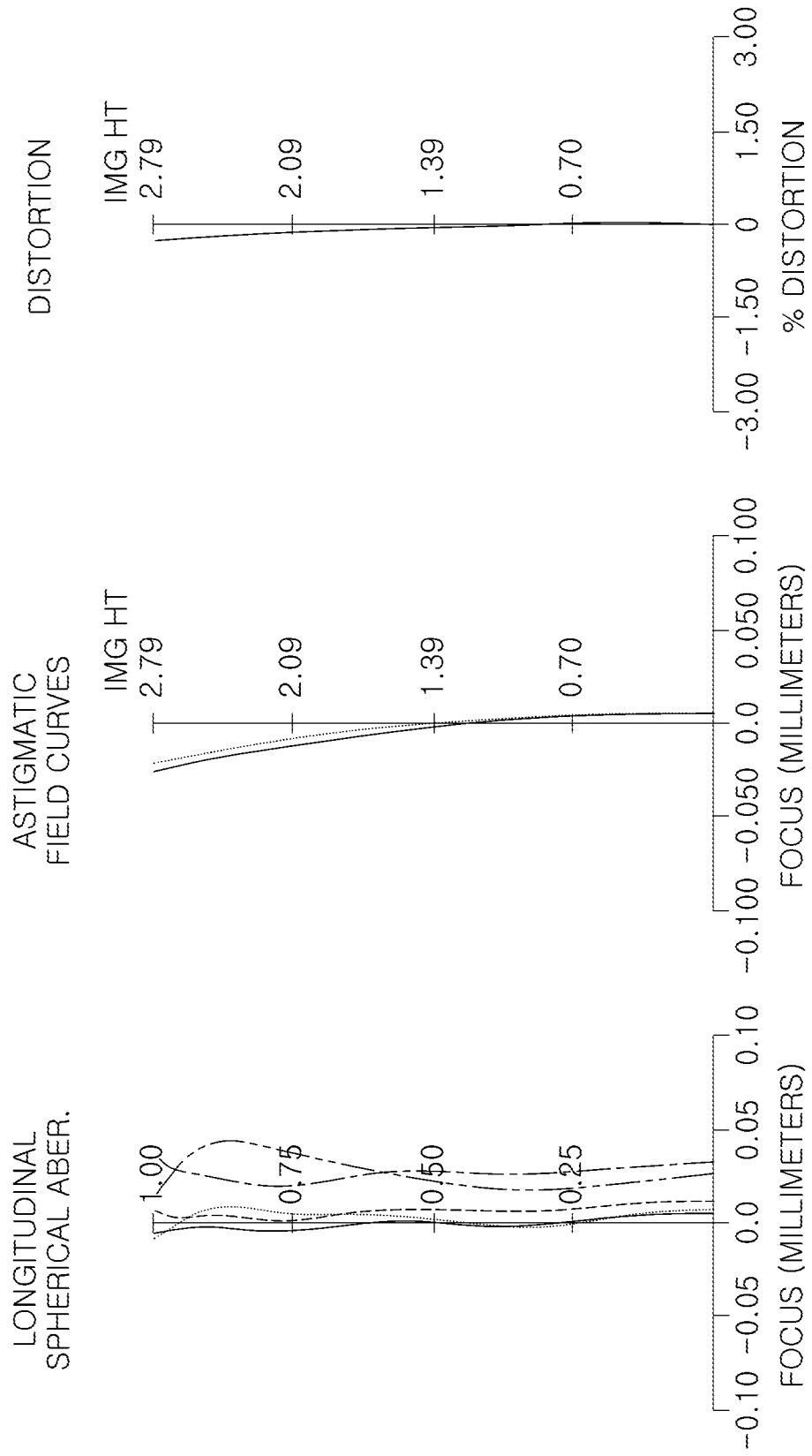
FIG. 8 is graphs having curves representing aberration characteristics of the optical imaging system illustrated in FIG. 7.

In addition, the optical imaging system configured as described above may have aberration characteristics illustrated in FIGS. 6 and 8.

An optical imaging system according to a third example will be described with reference to FIGS. 9 through 12.

Figure 9:
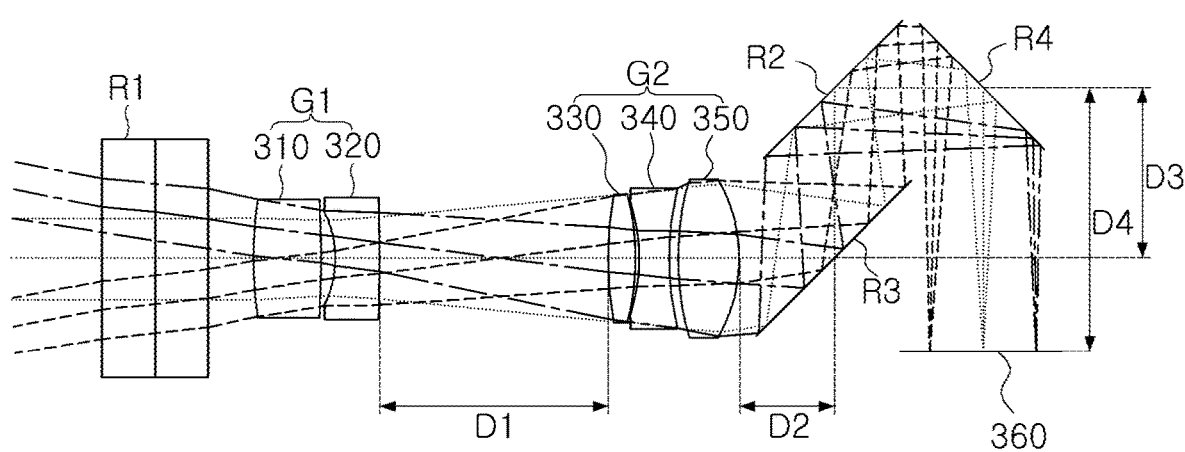
FIG. 9 is a view illustrating a state in which a first lens group and a second lens group are arranged in a first position in an optical imaging system according to a third example.
Figure 11:
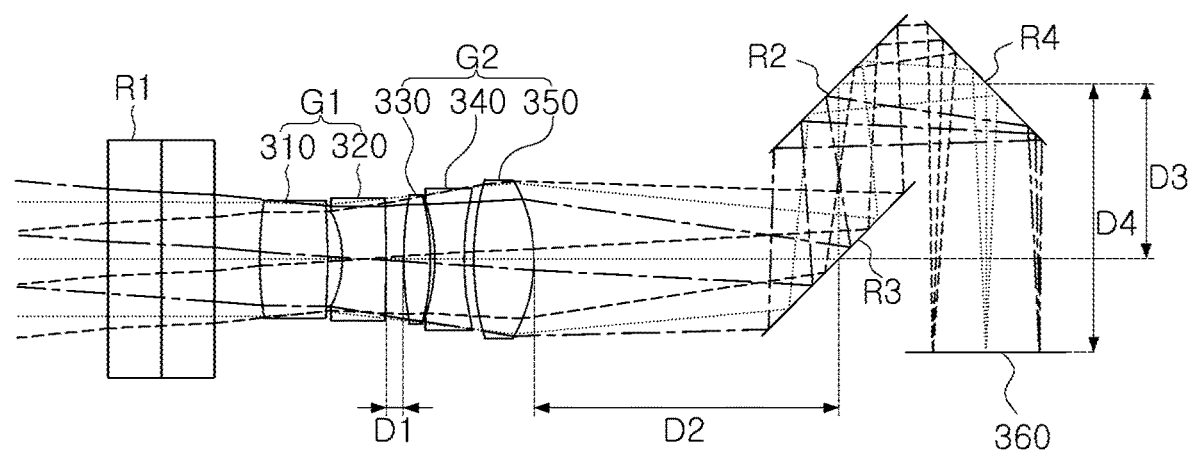
FIG. 11 is a view illustrating a state in which the first lens group and the second lens group are arranged in a second position in the optical imaging system according to the third example

FIG. 9 is a view illustrating a state in which a first lens group and a second lens group are arranged in a first position, and FIG. 11 is a view illustrating a state in which the first lens group and the second lens group are arranged in a second position.

The optical imaging system according to the third example may include a first lens group G1 and a second lens group G2.

The first lens group G1 may include a first lens 310 and a second lens 320, and the second lens group G2 may include a third lens 330, a fourth lens 340, and a fifth lens 350. In addition, the optical imaging system may further include a filter and an image sensor 360. In addition, a stop may be disposed between the first lens group G1 and the second lens group G2. For example, the stop may be disposed between the second lens 320 and the third lens 330.

In addition, the optical imaging system may further include a first reflecting member R1 disposed in front of the first lens 310 and having a reflecting surface changing a path of light. In the third example, the first reflecting member R1 may be a prism, but may also be a mirror.

A case in which the prism has a flat panel shape is illustrated in FIGS. 9 and 11, but the prism may actually have a triangular prismatic shape.

Light incident on the first reflecting member R1 may be refracted by the first reflecting member R1 and then pass through the first lens group G1 and the second lens group G2. For example, light incident on the first reflecting member R1 along a first optical axis may be refracted toward a second optical axis perpendicular to the first optical axis.

In addition, the optical imaging system may further include a second reflecting member R2, a third reflecting member R3, and a fourth reflecting member R4 arranged behind the fifth lens 350 and each having a reflecting surface changing a path of light. The second reflecting member R2, the third reflecting member R3, and the fourth reflecting member R4 may be arranged between the fifth lens 350 and the image sensor 360.

In the third example, the second reflecting member R2, the third reflecting member R3, and the fourth reflecting member R4 may be mirrors, but may also be prisms.

The light passing through the first lens group G1 and the second lens group G2 may be refracted by the second reflecting member R2. For example, the light passing through the first lens group G1 and the second lens group G2 may be refracted toward a third optical axis perpendicular to the second optical axis by the second reflecting member R2.

The light refracted by the second reflecting member R2 may be refracted again by the third reflecting member R3. For example, the light refracted toward the third optical axis by the second reflecting member R2 may be refracted toward a fourth optical axis perpendicular to the third optical axis by the third reflecting member R3.

The light refracted by the third reflecting member R3 may be refracted again by the fourth reflecting member R4. For example, the light refracted toward the fourth optical axis by the third reflecting member R3 may be refracted toward a fifth optical axis perpendicular to the fourth optical axis by the fourth reflecting member R4, and be then received by the image sensor 360.

The filter may be disposed between the fourth reflecting member R4 and the image sensor 360.

At least one of the first lens group G1 and the second lens group G2 may be moved in order to change an overall focal length of the optical imaging system. As an example, the second lens group G2 may be moved along the optical axis, such that an interval between the first lens group G1 and the second lens group G2 may be varied and an interval between the second lens group G2 and the second reflecting member R2 may be varied. In addition, an interval between the second lens group G2 and the image sensor 360 may be varied. Here, the 'interval' may refer to a distance on the optical axis between two members.

At least two of the second reflecting member R2, the third reflecting member R3, and the fourth reflecting member R4 may be moved. For example, the third reflecting member R3 may be moved, such that an interval between the second reflecting member R2 and the third reflecting member R3 may be varied. In addition, the fourth reflecting member R4 may be moved, such that an interval between the fourth reflecting member R4 and the image sensor 360 may be varied. The third reflecting member R3 and the fourth reflecting member R4 may be moved together.

In the present example, the first reflecting member R1 and the second reflecting member R2 may be fixed members whose positions are fixed, and the third reflecting member R3 and the fourth reflecting member R4 may be movable members whose positions may be varied.

Characteristics (radii of curvature, thicknesses of lenses or distances between the lenses, refractive indices, Abbe numbers, and focal lengths) of each lens are represented in Table 7.

D1 is a distance on the optical axis between the second lens 320 and the third lens 330, D2 is a distance on the optical axis between the fifth lens 350 and the second reflecting member R2, D3 is a distance on the optical axis between the second reflecting member R2 and the third reflecting member R3, and D4 is a distance on the optical axis between the fourth reflecting member R4 and the image sensor 360.

An interval between the first lens group G1 and the second lens group G2 in the first position may be different from that between the first lens group G1 and the second lens group G2 in the second position. For example, the first lens group G1 and the second lens group G2 may be located relatively distant from each other in the first position, and may be located relatively close to each other in the second position.

The overall focal length of the optical imaging system may be changed by varying the interval between the first lens group G1 and the second lens group G2.

In addition, a length of the path of the light between the second lens group G2 and the image sensor 360 may be changed by moving some of a plurality of reflecting members arranged between the second lens group G2 and the image sensor 360. For example, positions of the third reflecting member R3 and the fourth reflecting member R4 in the first position may be different from positions of the third reflecting member R3 and the fourth reflecting member R4 in the second position.

In the first position, an overall focal length fl of the optical imaging system may be 12.3 mm, Fno_I may be 3.72, FOVl may be 13°, BFL_I may be 30.082 mm, TTL_I may be 50.3 mm, and PTTL_I may be 56.666 mm.

TABLE 7

| Surface No. | Remark | Radius of Curvature | Thickness or Distance | Refractive Index | Abbe Number | Focal Length |
|---|---|---|---|---|---|---|
| S1 | First Reflecting Member | Infinity | 2.212 | 1.717 | 29.5 | |
| S2 | | Infinity | 2.212 | 1.717 | 29.5 | |
| S3 | | Infinity | 1.942 | | | |
| S4 | First Lens | 53.925 | 2.750 | 1.671 | 19.2 | 24.611 |
| S5 | | −23.745 | 0.662 | | | |
| S6 | Second Lens | −4.822 | 1.871 | 1.562 | 42.4 | −9.584 |
| S7 | | −50.14916 | D1 | | | |
| S8 | Third Lens | 12.161 | 0.967 | 1.544 | 56 | 17.207 |
| S9 | | −40.279 | 0.275 | | | |
| S10 | Fourth Lens | −10.348 | 1.288 | 1.593 | 31.7 | −8.185 |
| S11 | | 9.691 | 0.330 | | | |
| S12 | Fifth Lens | 9.863 | 2.556 | 1.544 | 56 | 7.730 |
| S13 | | −6.711 | D2 | | | |
| S14 | Second Reflecting Member | Infinity | 0.000 | | | |
| S15 | | Infinity | D3 | | | |
| S16 | Third Reflecting Member | Infinity | 0.000 | | | |
| S17 | | Infinity | 7.15 | | | |
| S18 | Fourth Reflecting Member | Infinity | 0.000 | | | |
| S19 | | Infinity | D4 | | | |
| S20 | Imaging Plane | Infinity | Infinity | | | |

TABLE 8

| | First Position | Second Position |
|---|---|---|
| D1 | 9.520 | 0.7424 |
| D2 | 4 | 12.777 |
| D3 | 7.448 | 7.691 |
| D4 | 11.484 | 11.726 |

In the second position, an overall focal length fh of the optical imaging system may be 24.4 mm, Fno_h may be 4.98, FOVh may be 6.5°, BFL_h may be 39.344 mm, TTL_h may be 50.784 mm, and PTTL_h may be 57.151 mm.

In the third example, the first lens group G1 may have negative refractive power as a whole. A focal length of the first lens group G1 may be −16.864 mm.

The second lens group G2 may have positive refractive power as a whole. A focal length of the second lens group G2 may be 12.909 mm.

The first lens 310 may have positive refractive power, and a first surface and a second surface thereof may be convex.

The second lens 320 may have negative refractive power, and a first surface thereof may be concave and a second surface thereof may be convex.

The third lens 330 may have positive refractive power, and a first surface and a second surface thereof may be convex.

The fourth lens 340 may have negative refractive power, and a first surface and a second surface thereof may be concave.

The fifth lens 350 may have positive refractive power, and a first surface and a second surface thereof may be convex.

Respective surfaces of the first to fifth lenses 310 to 350 may have aspherical coefficients as represented in Table 9. For example, all of object-side surfaces and image-side surfaces of the first to fifth lenses 310 to 350 may be aspherical.

TABLE 9

| | Conic Constant (K) | 4th-Order Coefficient (A) | 6th-Order Coefficient (B) | 8th-Order Coefficient (C) | 10th-Order Coefficient (D) | 12th-Order Coefficient (E) |
|---|---|---|---|---|---|---|
| S4 | 0 | 9.403E−04 | 2.958E−05 | 1.625E−06 | −1.181E−07 | 5.501E−09 |
| S5 | 0 | 3.924E−04 | 9.121E−05 | 5.065E−06 | 6.780E−08 | 2.807E−09 |
| S6 | 0 | 7.774E−04 | 8.386E−05 | 8.411E−06 | −8.203E−07 | −7.356E−19 |
| S7 | 0 | 4.910E−04 | −1.777E−05 | 1.937E−06 | −2.417E−07 | 4.069E−19 |
| S8 | 0 | −4.630E−04 | −1.869E−05 | −6.138E−06 | −4.524E−08 | −5.063E−09 |
| S9 | 0 | 1.072E−04 | −4.783E−06 | 1.065E−06 | −4.224E−07 | −1.913E−18 |
| S10 | 0 | 2.648E−05 | 9.064E−06 | 1.089E−06 | −1.731E−07 | 4.974E−19 |
| S11 | 0 | −9.940E−05 | −2.410E−05 | −5.241E−06 | 6.956E−08 | −2.247E−18 |
| S12 | 0 | −2.812E−05 | −5.747E−06 | −9.381E−07 | 1.066E−07 | −3.215E−09 |
| S13 | 0 | 2.403E−04 | 2.001E−05 | −1.057E−06 | 2.630E−07 | −3.767E−09 |

Figure 10:
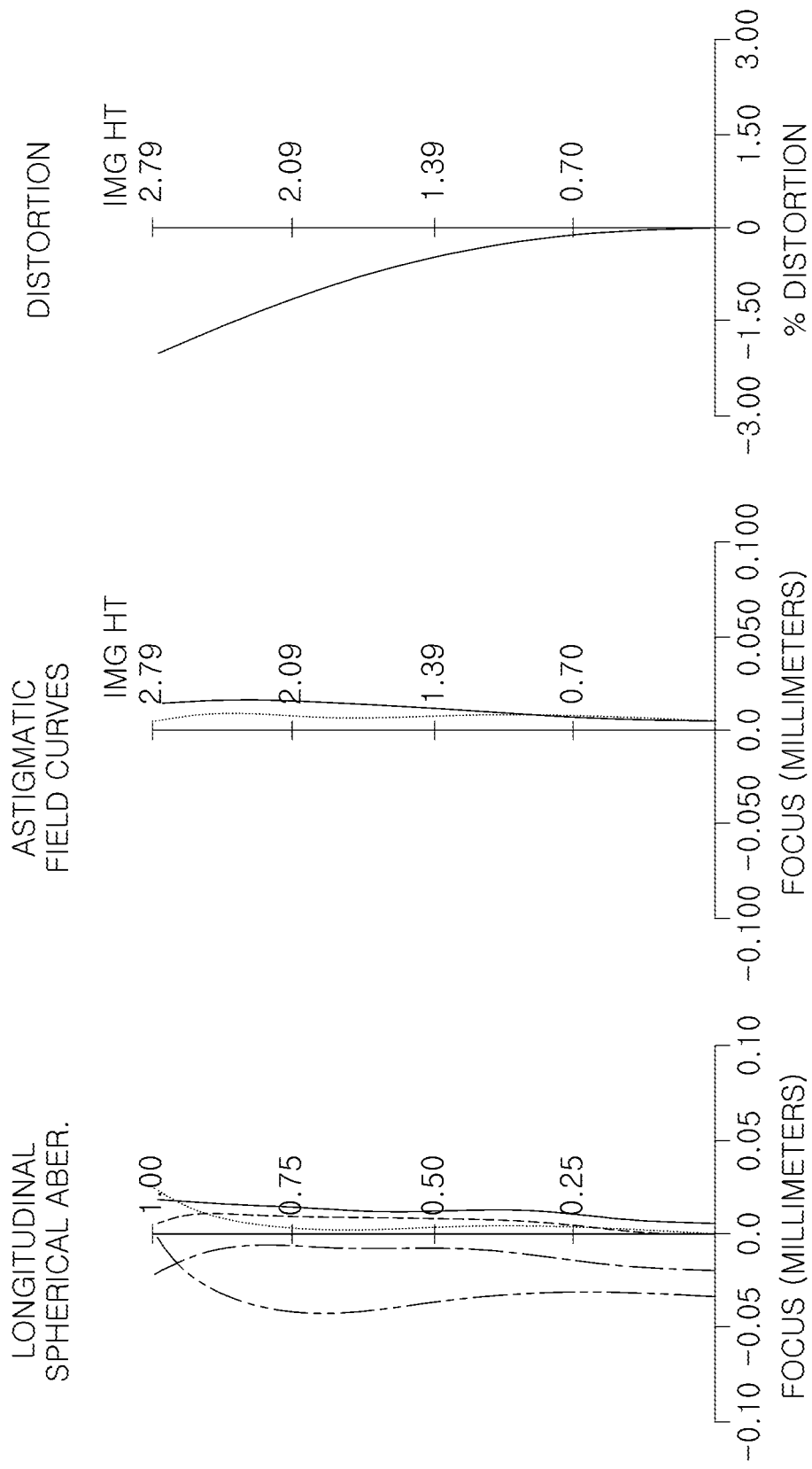
FIG. 10 is graphs having curves representing aberration characteristics of the optical imaging system illustrated in FIG. 9.
Figure 12:
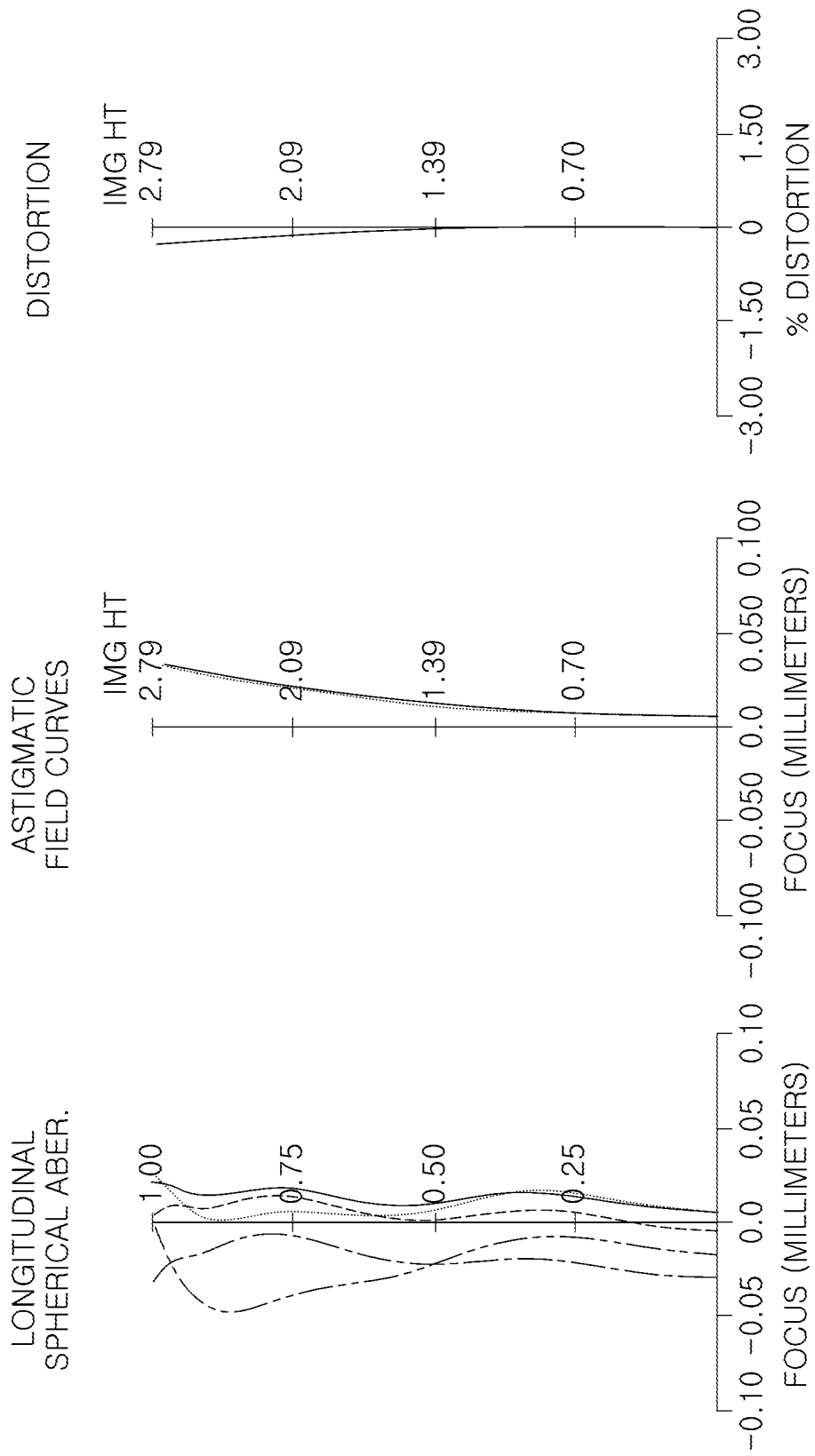
FIG. 12 is graphs having curves representing aberration characteristics of the optical imaging system illustrated in FIG. 11.

In addition, the optical imaging system configured as described above may have aberration characteristics illustrated in FIGS. 10 and 12.

As set forth above, the optical imaging system according to the various examples may implement a zoom function by varying a focal length.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a first lens group comprising a plurality of lenses;
    a second lens group comprising a plurality of lenses;
    a first reflecting member disposed on an object side of the first lens group; and
    a plurality of second reflecting members arranged between the second lens group and an image sensor,
    wherein one or both of the first lens group and the second lens group are configured to be moved along an optical axis such that an interval between the first lens group and the second lens group along the optical axis is variable between a maximum interval and a minimum interval, and
    two of the plurality of second reflecting members are configured to be moved together such that a distance that the light that has passed through the second lens group travels between the second lens group and the image sensor is variable.

2. The optical imaging system of claim 1, wherein the first lens group has negative refractive power, and the second lens group has positive refractive power.

3. The optical imaging system of claim 1, wherein the first lens group comprises a first lens having positive refractive power and a second lens having negative refractive power.

4. The optical imaging system of claim 1, wherein the second lens group comprises a third lens having positive refractive power, a fourth lens having negative refractive power, and a fifth lens having positive refractive power.

5. The optical imaging system of claim 1, wherein fl/fh<0.7, where fl is an overall focal length of the optical imaging system when the interval between the first lens group and the second lens group is the maximum interval, and fh is an overall focal length of the optical imaging system when the interval between the first lens group and the second lens group is the minimum interval.

6. The optical imaging system of claim 5, wherein BFL_h>30 mm, where BFL_h is a distance along the optical axis from an image-side surface of a rearmost lens of the plurality of lenses of the second lens group to an imaging plane when the interval between the first lens group and the second lens group is the minimum interval.

7. The optical imaging system of claim 1, wherein D1_2/D1_1<0.3, where D1_1 is the maximum interval, and D1_2 is the minimum interval.

8. The optical imaging system of claim 1, wherein FOVl/FOVh>1.6, where FOVl is a field of view of the optical imaging system when the interval between the first lens group and the second lens group is the maximum interval, and FOVh is a field of view of the optical imaging system when the interval between the first lens group and the second lens group is the minimum interval.

9. The optical imaging system of claim 1, wherein fG1/fG2<−0.5, where fG1 is a focal length of the first lens group, and fG2 is a focal length of the second lens group.

10. The optical imaging system of claim 1, wherein the second lens group is configured to be movable along the optical axis such that a distance along the optical axis between the second lens group and the plurality of second reflecting members is varied.

11. The optical imaging system of claim 1, wherein the plurality of second reflecting members comprise a second reflecting member, a third reflecting member, a fourth reflecting member, and a fifth reflecting member sequentially arranged from the second lens group toward the image sensor,
- the third reflecting member is configured to be moved, such that an interval between the second reflecting member and the third reflecting member is varied, and
- the fourth reflecting member is configured to be moved, such that an interval between the fourth reflecting member and the fifth reflecting member is varied.

12. The optical imaging system of claim 11, wherein the third reflecting member and the fourth reflecting member are configured to be moved together.

13. The optical imaging system of claim 1, wherein the plurality of second reflecting members comprise a second reflecting member and a third reflecting member sequentially arranged from the second lens group toward the image sensor.

14. The optical imaging system of claim 13, wherein the second reflecting member and the third reflecting member are configured to be moved together.

15. The optical imaging system of claim 13, wherein the plurality of second reflecting members further comprise a fourth reflecting member disposed between the third reflecting member and the image sensor.

16. The optical imaging system of claim 15, wherein the third reflecting member and the fourth reflecting member are configured to be moved together.

* * * * *